United States Patent [19]

Chen

[11] Patent Number: 5,072,154
[45] Date of Patent: Dec. 10, 1991

[54] AUTOMATIC LUMINOSITY CONTROL DEVICE FOR CAR AND MOTOR BICYCLE HEADLAMPS

[76] Inventor: Min-Hsiung Chen, 3F. No. 10, Alley 102, Lane 109, Der-Hsin E. Rd., Taipei, Taiwan

[21] Appl. No.: 492,657

[22] Filed: Mar. 13, 1990

[51] Int. Cl.$^5$ ...................... H05B 37/02; H01J 40/14
[52] U.S. Cl. ..................................... 315/82; 315/153; 315/158; 315/210; 315/296; 250/214 D
[58] Field of Search .................. 315/82, 149, 152, 153, 315/158, 209 R, 210, 250, 287, 296, 307, 312; 250/214 D

[56] References Cited

U.S. PATENT DOCUMENTS 4,587,457 5/1986 Lind ....................................... 315/64
4,645,975 2/1987 Meitzler et al. ....................... 315/82

Primary Examiner—David Mis
Attorney, Agent, or Firm—Bucknam and Archer

[57] ABSTRACT

A luminosity control device includes a photosensitive member to control the duty cycle of a square wave pulse oscillator. Then a high power switching tube and a high power gain tube are used to proceed with the luminosity control. Thus, when two cars meet, the luminosity of headlamps will automatically weaken so as not to dazzle the driver's eyes in the opposite direction. Should no car come in the opposite direction, the headlamps will automatically intensify the luminosity thereof. In this manner, it is possible to effectively control the luminosity of headlamps and thereby achieve the object of traffic safety.

1 Claim, 1 Drawing Sheet

AUTOMATIC LUMINOSITY CONTROL DEVICE FOR CAR AND MOTOR BICYCLE HEADLAMPS

BACKGROUND OF THE INVENTION

Due to higher national income, the growth of both cars and motor bicycles has been very rapid in recent years. As a result, the volume of traffic is increasing day by day.

Traffic has become a subject to be concerned about by the general public.

In the meantime, the possibility of driving at night has increased. Therefore, the current volume of traffic is at high level almost 24 hours a day. When driving at night, it is necessary to turn on the headlamps, which is explicitly set out by law.

According to our experiences in respect to the driving at night, although it needs to change the headlamp luminosity subject to the road conditions from time to time, it is often heard that the driver's eyes get dazzled by the strong light coming from the car in the opposite direction, especially on the road without a traffic island. Maybe such a strong light is beyond control, not intentionally caused by the driver in the opposite direction, but some traffic accidents have happened due to such a situation.

Besides, when driving on a road with a considerable amount of curves, the driver must frequently alternate distance light with dim light all the way. In this case the driver may become exhausted when he finishes his run.

SUMMARY OF THE INVENTION

With the above in mind, the applicant has therefore dedicated himself to relative research based on his experience of driving at night for many years, and finally made possible the present invention after a lot of efforts.

An automatic luminosity control device for a car or a motor bicycle headlamps is described, comprising a photosensitive member (Ru) being set in the front of said car or motorcycle, and a variable bistable oscillator comprising a first transistor (Q1), a second transistor (Q2), a capacitor (C2), said photosensitive member (Ru), a first resistor (R1), a second resistor (R2), a third resistor (R3) and a fourth resistor (R4), said headlamps comprising distance light means and dim light means, said distance light means and dim light means being connected with said variable bistable oscillator whereby when the said photosensitive member is activated, the luminosity of said distance light means is gradually reduced while the luminosity of said dim light means is increased.

BRIEF DESCRIPTION OF THE DRAWINGS

The present invention will be best understood from the following description when read in conjunction with the accompanying drawings, in which.

DESCRIPTION OF THE PREFERRED EMBODIMENT

Figure 1:
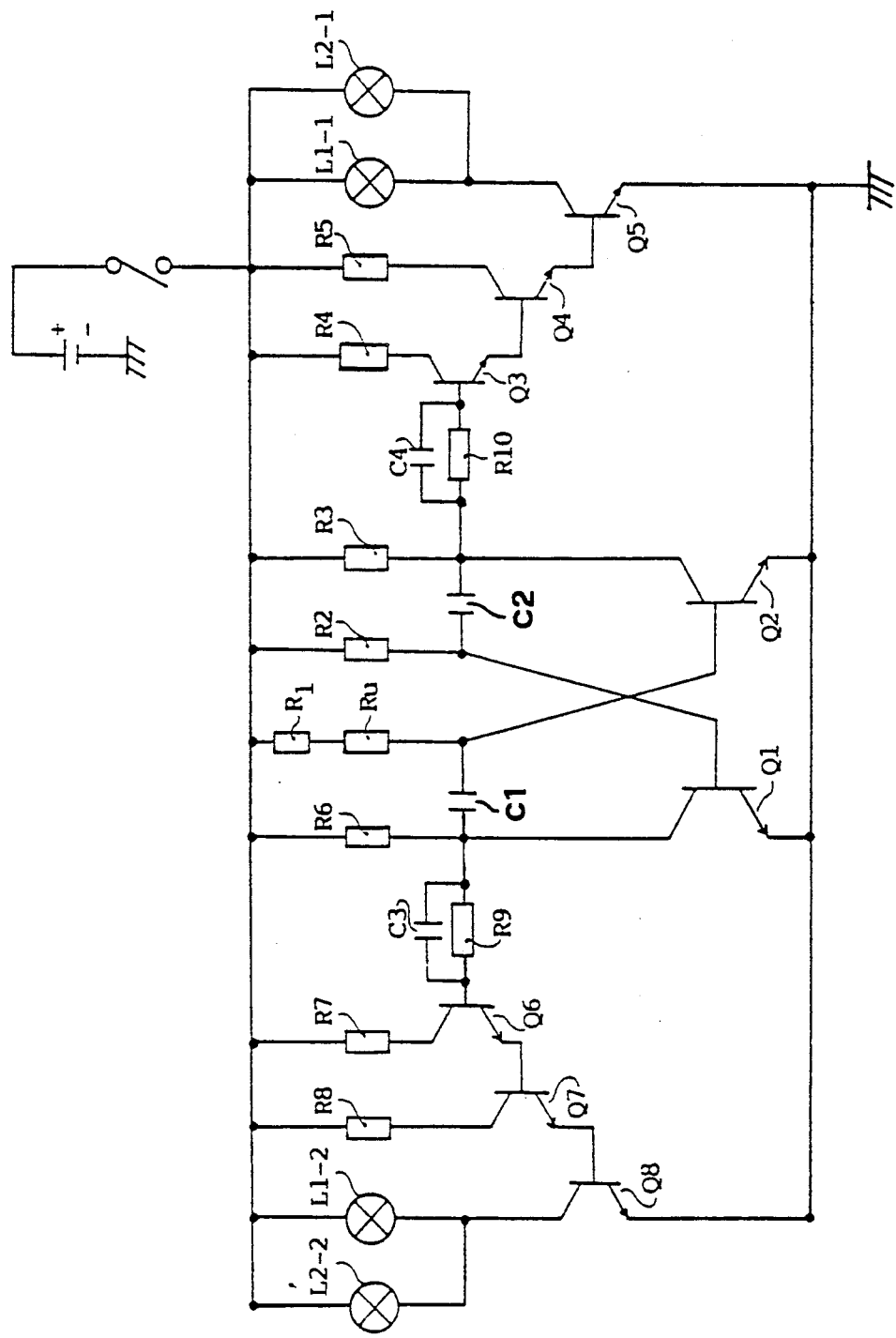
FIG. 1 is a wiring diagram of the present invention.

As shown in the drawing, the device includes a photosensitive member Ru which can be set at an appropriate place at the front of a vehicle for exposure to the light emission coming from approaching vehicles, and a variable duty cycle bistable oscillator comprising of transistors Q1, Q2, capacitor C2, photosensitive member Ru, and resistors R1, R2, R3 and R4, for operation when driving at night.

If the photosensitive member Ru is not exposed to light when driving at night, the high resistance of Ru will cause transistor Q1 to be saturated and transistor Q2 to be cut off. As a result, transistors Q3, Q4 and Q5 are all in the saturation state. At this time, the brightness of the distance lights, or main headlamps, L1-1, L2-1 is strongest, transistors Q6, Q7, and Q8 are all cut off, and the dim or dipped lights do not light up. However, when photosensitive member Ru is exposed to the light from a vehicle approaching from the opposite direction, its resistance is decreasing as the vehicle in the opposite direction is getting closer and closer. At this time, the bistable square wave oscillator begins to work, and pulse signals collectively transmitted from transistor Q2 will prolong the saturation time of Q2 and reduce the duty cycle of Q5, so that the brightness of distance lights L1-1, L2-1 will gradually reduce and finally the lights will go out. Meanwhile, pulse signals collectively transmitted from transistor Q2 will also prolong the cut-off time of Q2 and increase the duty cycle of Q8, so the dim or dipped lights L1-2, L2-2 become brighter and brighter and finally are at full luminous intensity. With such a design, the luminosity change of distance lights and dim lights can be done simultaneously.

While the weakening luminosity of distance lights does not dazzle the driver's eyes in the opposite direction, the dim lights will increase their luminosity toward the road surface. In this case, when two cars meet, the road surface can be clearly lightened by the dim lights, and the driver's eyes are not dazzled by the distance lights.

In addition, C1, C2 and R3 can be adjusted to change their initiating points and the rate of variation, R2 can be adjusted to make the dim lights to be lightened up and the distance lights be extinguished (as Ru is exposed to the light emission). After the car in the opposite direction goes away, the exposed area of Ru will rapidly increase, making Q1 to be saturated and Q2 be cut off. Then, the distance lights can recover to the extent of full luminous intensity while the dim lights are extinguished.

In the practical use of the present invention, the luminosity of headlamps can vary with the surrounding light emission so as to be available for any road conditions. Further, it will not dazzle the driver's eyes when two cars meet, thus reducing the possibility of traffic accident.

Although particular embodiment of the present invention have been described and illustrated herein, it is recognized that modifications and variations my readily occur to those skilled in the art and consequently, it is intended that the claims be interpreted to cover such modifications and equivalents.

I claim:

1. An automatic luminosity control device for a car or a motor bicycle headlamps, comprising a photosensitive member (Ru) being set in the front of said car or motorcycle, and a variable bistable oscillator comprising a first transistor (Q1), a second transistor (Q2), a capacitor (C2), said photosensitive member (Ru), a first resistor (R1), a second resistor (R2), a third resistor (R3) and a fourth resistor (R4), said headlamps comprising distance light means and dim light means, said distance light means and dim light means being connected with said variable bistable oscillator whereby when the said photosensitive member is activated, the luminosity of said distance light means is gradually reduced while the luminosity of said dim light means is increased.

* * * * *